No. 736,285. PATENTED AUG. 11, 1903.
J. W. MARTIN.
MECHANICAL MOVEMENT.
APPLICATION FILED NOV. 3, 1902.
NO MODEL.
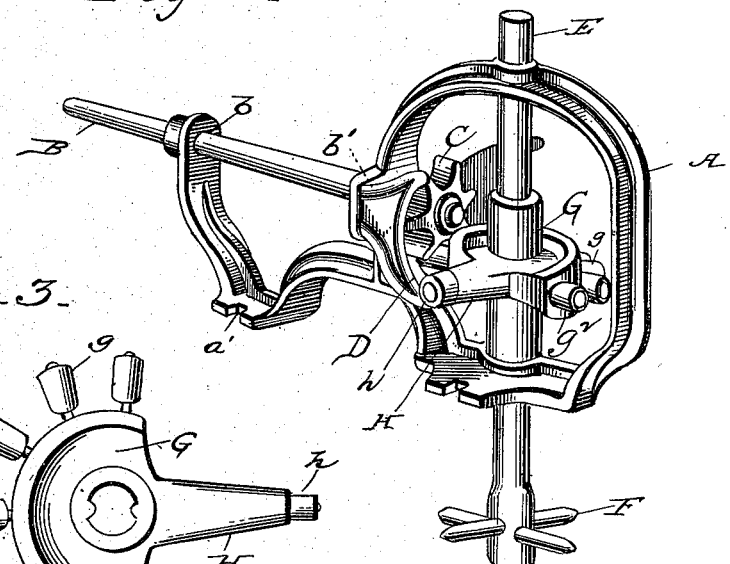
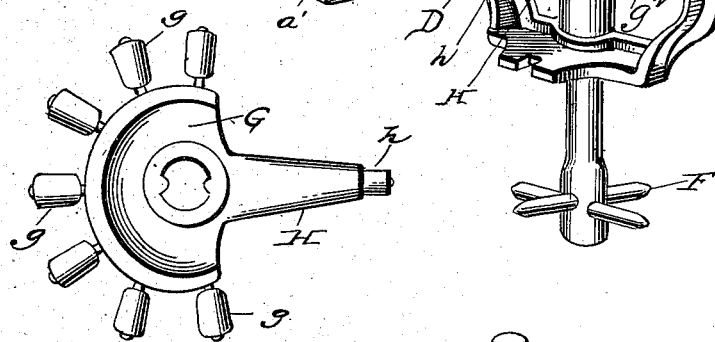
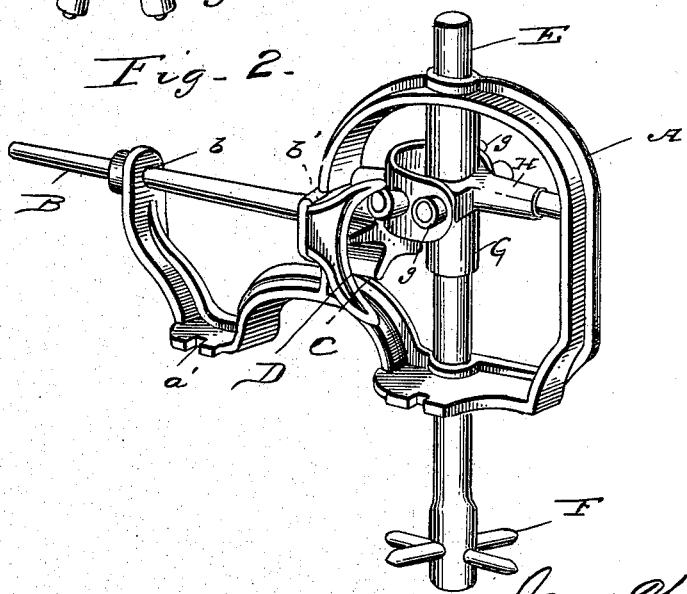
Witnesses
Inventor
James W. Martin.
By
Attorney No. 736,285. Patented August 11, 1903.

UNITED STATES PATENT OFFICE.

JAMES W. MARTIN, OF OMAHA, NEBRASKA, ASSIGNOR TO THE INTERNATIONAL MANUFACTURING CO., OF OMAHA, NEBRASKA.

MECHANICAL MOVEMENT.

SPECIFICATION forming part of Letters Patent No. 736,285, dated August 11, 1903.

Application filed November 3, 1902. Serial No. 129,804. (No model.)

*To all whom it may concern:*

Be it known that I, JAMES W. MARTIN, a citizen of the United States, residing at Omaha, in the county of Douglas and State of Nebraska, have invented certain new and useful Improvements in Mechanical Movements, of which the following is a specification.

This invention relates to an improved form of mechanism especially adapted for use in connection with washing-machines and other devices of that class where a rotary reciprocating or a rotary reciprocating and oscillating motion is desired.

One of the principal objects of the present invention is to provide a competent and reliable means of automatic operation performed without interrupting the speed of source of power.

With these objects in view I will proceed to describe the preferred form of embodiment in connection with the accompanying drawings, wherein—

Figure 1 illustrates a perspective view of my device in a position the hub assumes just before it begins to ascend. Fig. 2 is a similar view of the device, showing the hub in a raised position; and Fig. 3 is a plan view of the hub and its friction-rollers.

Like letters of reference in the several figures indicate the same parts.

A represents a casting, as shown in the drawings, provided with vertical and horizontal bearings and also provided with means $a'$ for securing the device to a lid or cover upon which it is to be operated. The horizontal bearings $b$ $b'$ carry a driving-shaft B, which may be driven from any source of power. Keyed or otherwise secured to the inner end of this shaft is a small pinion C. The inner bearings $b'$ have ears or projections on each side of the shaft, with sockets in them for the reception of arms having cam-surfaces D.

I arrange in the vertical bearings a shaft E, having at its lower end a dasher F of any desired construction. On this vertical shaft is mounted a hub G, which is splined thereon for the purpose of allowing it a vertical movement while the shaft is revolving in a horizontal plane, though where it is necessary to give the shaft both a vertical and a horizontal motion this hub may be rigidly secured thereto. The hub carries a series of friction-rollers $g$, adapted to engage with the teeth of the pinion, and is also provided with a spindle H, carrying at its extremity a revolving collar $h$. In the horizontal movement of the hub the lower rim $g^2$ rests on the extended journal or shaft B. This extended journal operates as a support, upon which the hub rests during all of the time while the spindle is away from the pinion.

The operation of my device is as follows: The parts being in the position indicated in Fig. 1 and a continuous rotary motion being imparted to the shaft B, carrying the pinion C, the spindle or arm H, initially engaging one of the cams D at its base, will as engagement is effected between said pinion and the cogs $g$ ascend the face or concavity of said cam, causing the hub, with its sleeve, to move upwardly. Upon the arm H reaching the upper end of said concavity or face and said pinion, escaping the upper surfaces of said teeth or cogs, having arrived at the adjacent mutilated portion of said hub or gear, and thus brought into engagement with the lower surfaces of said cogs or teeth, the movement of said hub will be reversed, said movement being in a horizontal plane. Said arm or spindle during such reversed movement of said hub will finally engage the opposite or other cam D at its upper end and the pinion C likewise arrive at the opposite mutilated portion of said hub or gear, thus permitting the reëngagement of said pinion with the upper surfaces of said cogs or teeth. The movement of said hub or gear will thus again be reversed also in a horizontal direction and the parts caused to travel or return to their initial or first-referred-to position again ready for a repetition of the aforesaid movement, thus imparting a rotary reciprocating movement to the dasher or other shaft it is desired to actuate.

Having thus described my invention, what I claim, and desire to secure by Letters Patent, is—

1. In mechanism as described the combination of a sliding mutilated gear, a shaft rotatable by said gear, means for actuating said gear and cams, said gear having an arm projecting from its mutilated or toothless portion and adapted to alternately engage said cams.

2. In mechanism as described, the combination of a mutilated sliding gear, a shaft rotatable by said gear, means for actuating said gear and cams having concaved faces, said gear having an arm projecting from its mutilated or toothless portion and adapted to alternately engage said cams.

3. In mechanism as described, the combination of a sliding mutilated gear, a shaft geared therewith, a shaft rotatable by said mutilated gear, said mutilated gear having an arm projecting from its mutilated portion, curved-faced cams adapted to be alternately engaged by said arm, the gear of the first-referred-to shaft and said mutilated gear being so arranged that said shaft-gear is adapted, as said arm contacts with one cam-face, to engage the lower surfaces of the cogs of said mutilated gear and, that as said arm contacts with the other of said cams said shaft-gear is adapted to engage the upper surfaces of said cogs to effect the reversal of the movement of said mutilated gear.

In testimony whereof I affix my signature in presence of two witnesses.

JAMES W. MARTIN.

Witnesses:
LOUIS MIKKLESEN,
HIRAM A. STURGES.